US006412785B1

(12) United States Patent
Lin

(10) Patent No.: US 6,412,785 B1
(45) Date of Patent: Jul. 2, 2002

(54) OIL SEAL FOR A DOOR CLOSING DEVICE

(75) Inventor: Ming-Yu Lin, Kaohsiung Hsien (TW)

(73) Assignee: Taiwan Fu Hsing Industrial Co., Ltd., Kaohsiung Hsien (TW)

(*) Notice: Subject to any disclaimer, the term of this patent is extended or adjusted under 35 U.S.C. 154(b) by 0 days.

(21) Appl. No.: 09/657,575

(22) Filed: Sep. 8, 2000

(51) Int. Cl.[7] ................................................ F16J 15/54
(52) U.S. Cl. ......................................... 277/500; 49/336
(58) Field of Search ................................ 277/500, 910; 49/264, 273, 334, 336

(56) References Cited

U.S. PATENT DOCUMENTS

| | | | | | |
|---|---|---|---|---|---|
| 4,220,051 A | * | 9/1980 | Catlett | ......................... | 49/137 |
| 4,293,291 A | * | 10/1981 | Link | .......................... | 277/500 |
| 4,333,270 A | * | 6/1982 | Catlett | ......................... | 49/336 |
| 4,998,932 A | * | 3/1991 | Rosen et al. | .................. | 606/29 |
| 5,036,620 A | * | 8/1991 | Beran et al. | .................. | 49/141 |
| 5,586,724 A | * | 12/1996 | Allen | ...................... | 222/145.5 |

FOREIGN PATENT DOCUMENTS

TW 342025 10/1998

* cited by examiner

*Primary Examiner*—Anthony Knight
*Assistant Examiner*—John L. Beres
(74) *Attorney, Agent, or Firm*—Bacon & Thomas, PLLC

(57) ABSTRACT

A door closing device. The device includes a main body, a shaft, an annular cover mounted in the main body, and a planar gasket. Two ends of the shaft are rotatably supported in the annular cover by a collar. The planar gasket is mounted around the shaft and between the collar and a peripheral edge defining a central annular hole of the annular cover. The planar gasket includes an inner diameter approximately the same as an outer diameter of the shaft and an outer diameter approximately the same as an inner diameter of the annular cover. The planar gasket further includes two opposed planar surfaces.

4 Claims, 2 Drawing Sheets

OIL SEAL FOR A DOOR CLOSING DEVICE

BACKGROUND OF THE INVENTION

1. Field of the Invention

The present invention relates to an oil seal for a door closing device that has a longer longevity.

2. Description of the Related Art

Taiwan Utility Model Publication No. 342025, issued on Oct. 1, 1998 and entitled "BASE STRUCTURE FOR A DUAL-FUNCTION DOOR CLOSING DEVICE", as illustrated in FIGS. 1 and 2 of the drawings, discloses an automatic door closing device 9 that is mounted to a door. When the door is opened, a shaft 91 is turned, a movable plug 93, via transmission by a gear 92 on the shaft 91 and a rack (not labeled) that is formed on the movable plug 93 and meshed with the gear 92, is moved to compress an elastic element 94 and make working fluid to flow. When the force that opens the door vanishes, the door is automatically closed under the action of the return force of the elastic element 94 and back flow of the working fluid. An oil seal 95 is mounted to the shaft 91 to avoid leakage of the working fluid via a gap between the cover 96 and the shaft 91. Nevertheless, during flow, the working fluid exerts a force on the oil seal 95 and thus makes the oil seat 95 press against a peripheral edge 97 defining a central annular hole of the cover 96. After a term of usage, the oil seal 95 deforms. Or, an annular recess is generated due to friction between the oil seal 95 and the peripheral edge 97 of the cover 96. Leakage occurs accordingly, as the oil seal 95 no longer provides the required sealing effect.

SUMMARY OF THE INVENTION

It is an object of the present invention to provide a door closing device with an oil seal that is not easy to deform and damage and is thus durable.

A door closing device in accordance with the present invention comprises a main body, a shaft, an annular cover mounted in the main body, and a planar gasket. Two ends of the shaft are rotatably supported in the annular cover by a collar. The planar gasket is mounted around the shaft and between the collar and a peripheral edge defining a central annular hole of the annular cover. The planar gasket includes an inner diameter approximately the same as an outer diameter of the shaft and an outer diameter approximately the same as an inner diameter of the annular cover. The planar gasket further includes two opposed planar surfaces.

The planar gasket is made from an oil-resisting material, such as tetrafluoro-ethane resin.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENT

A preferred embodiment in accordance with the present invention will now be described with reference to the accompanying drawings.

Figure 1:
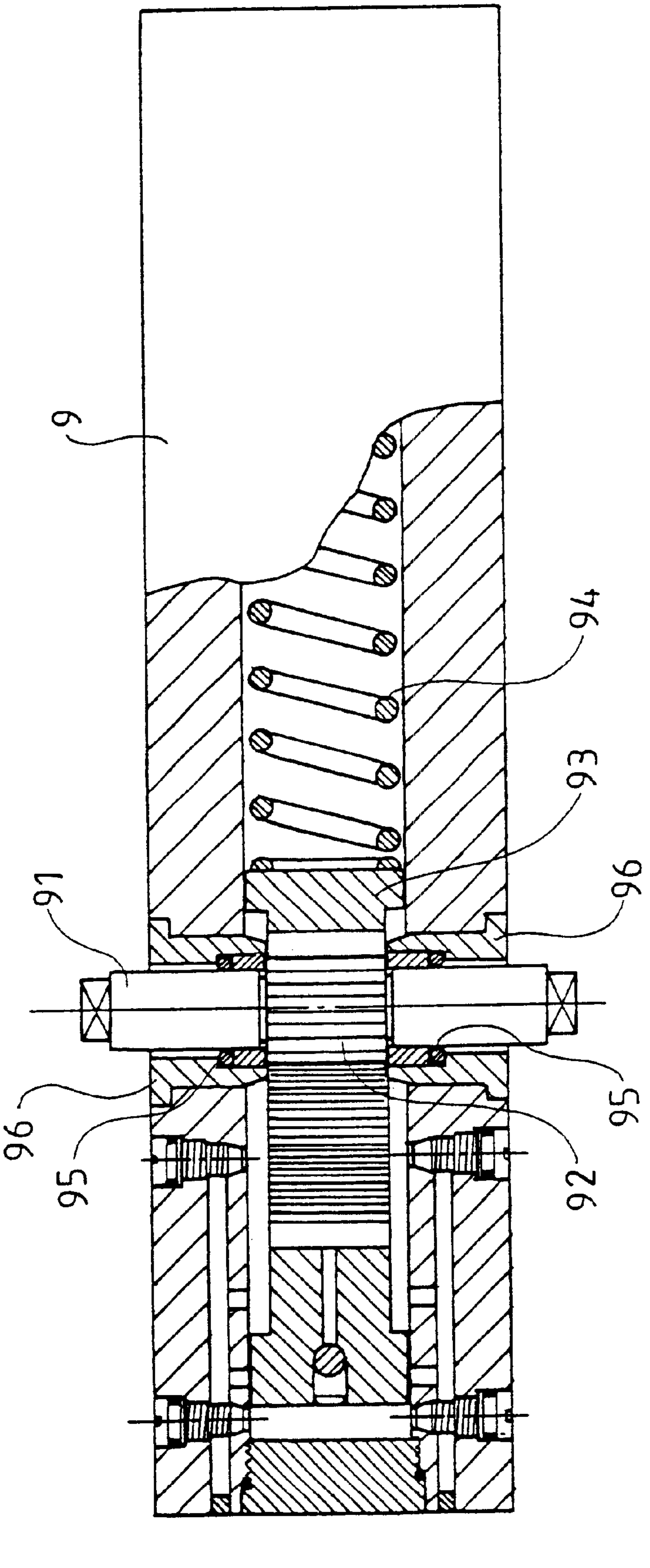
FIG. 1 PRIOR ART
FIG. 1 is a sectional view of a conventional door closing device.
Figure 3:
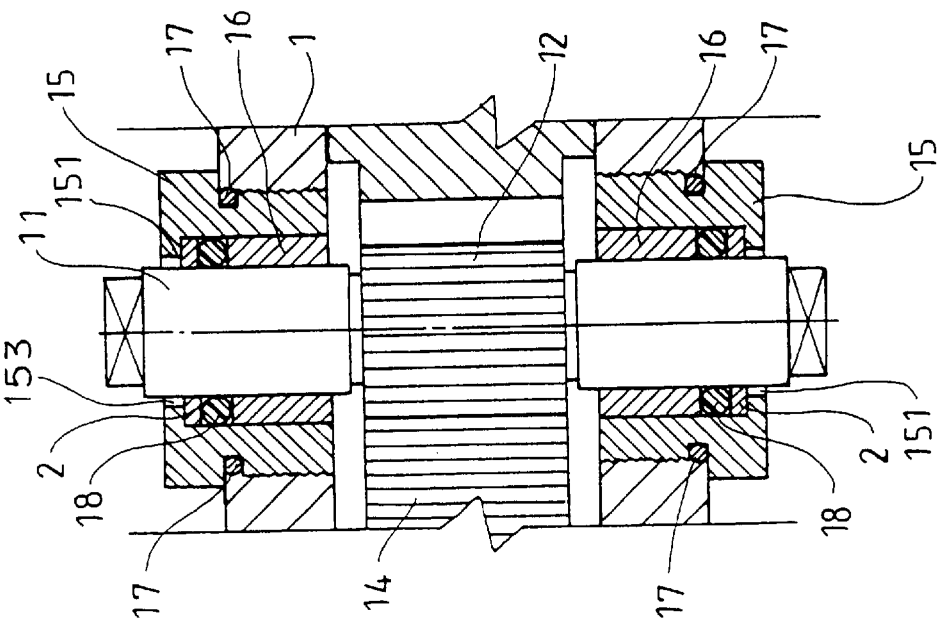
FIG. 3 is a sectional view of a door closing device in accordance with the present invention.
Figure 2:
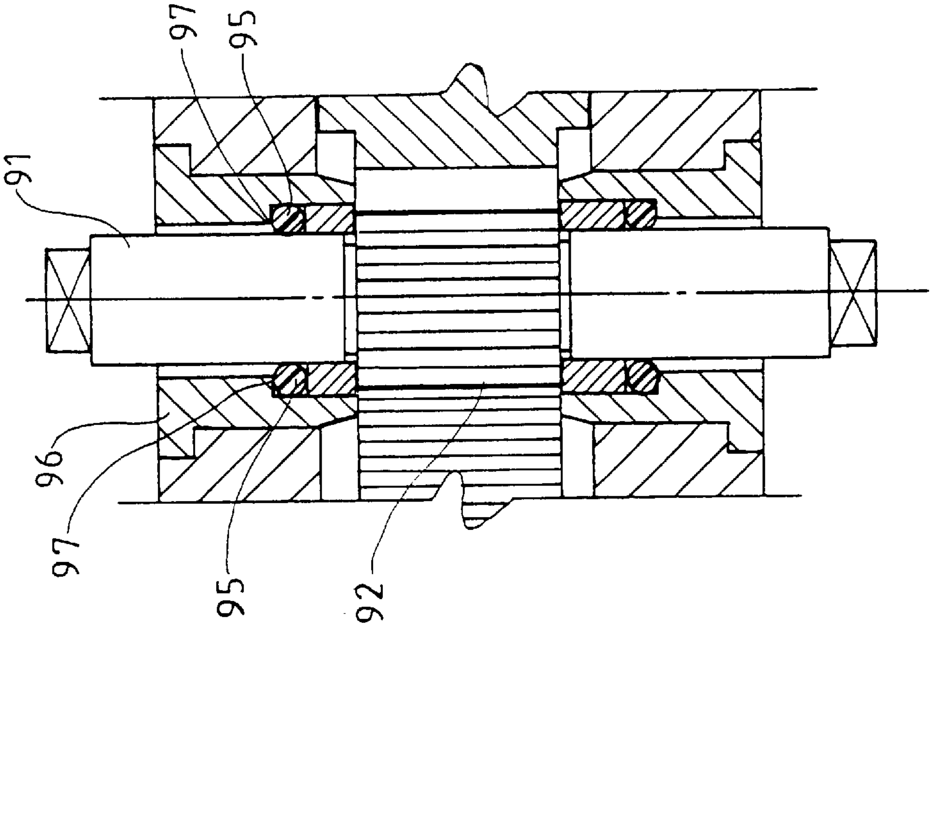
FIG.2 PRIOR ART
FIG. 2 is an enlarged view of a portion of the door closing device in FIG. 1.

Referring to FIG. 3, a door closing device in accordance with the present invention generally includes a main body 1 having a shaft 11 rotatably supported therein. The shaft 11 has a gear 12 that meshes with a rack 14 of a movable plug 13. In this embodiment, two ends of the shaft 11 are rotatably supported by a collar 16 so as to rotate in an annular cover 15 that is threadedly engaged with the main body 1. If desired, an outer seal 17 is mounted between the main body 1 and the annular cover 15, and an inner seal 18 is mounted between the collar 16 and a peripheral edge 151 defining a central annular hole 153 of the annular cover 15.

Of more importance, a planar gasket 2 is mounted around the shaft 11 and between the inner seal 18 and the peripheral edge 151 defining the central annular hole 153 of the annular cover 15. The planar gasket 2 has an inner diameter approximately the same as an outer diameter of the shaft 11 and an outer diameter approximately the same as an inner diameter of the annular cover 15. In addition, the planar gasket 2 includes two opposed planar surfaces and is made from an oil-resisting material, such as plastics or tetrafluoro-ethane resin.

When the working fluid flows, it exerts a force to an area between the inner seal 18 and the planar gasket 2 and thus causes a plane-to-plane contact between the inner seal 18 and the planar gasket 2. As a result, the inner seal 18 will not be pressed against by the peripheral edge 151 defining the central annular hole of the annular cover 15. Thus, the inner seal 18 will not deform and thus have a longer longevity.

By means of changing the position of the inner seal 18 in the annular cover 15, the inner seal 18 will not be pressed against by the peripheral edge 151 defining the central annular hole 153 of the annular cover 15. When the inner seal 18 is subjected to hydraulic pressure from the working fluid, the former is in plane-to-plane contact with the planar gasket 2. Thus, the hydraulic pressure is distributed over the whole surface. No recess will be generated in the inner seal 18. Thus, the inner seal 18 has a longer longevity.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A door closing device comprising:

a main body;

a shaft including two ends;

an annular cover mounted to the main body, the two ends of the shaft being rotatably supported in the annular cover by a collar and an inner seal, the annular cover including a central annular hole; and a planar gasket mounted around the shaft and positioned between the inner seal and a peripheral edge defining the central annular hole of the annular cover, the planar gasket including an inner diameter approximately the same as an outer diameter of the shaft, the planar gasket including an outer diameter approximately the same as an inner diameter of the annular cover, the planar gasket further including two opposed planar surfaces.

2. The door closing device as claimed in claim 1, wherein the planar gasket is made from an oil-resisting material.

3. The door closing device as claimed in claim 1, wherein the planar gasket is made from tetrafluoro-ethane resin.

4. The door closing device as claimed in claim 2, wherein the planar gasket is made from tetrafluoro-ethane resin.

* * * * *